March 4, 1969     M. ROTH     3,430,575
CONSTANT THREAD LOAD COVER
Filed June 5, 1967
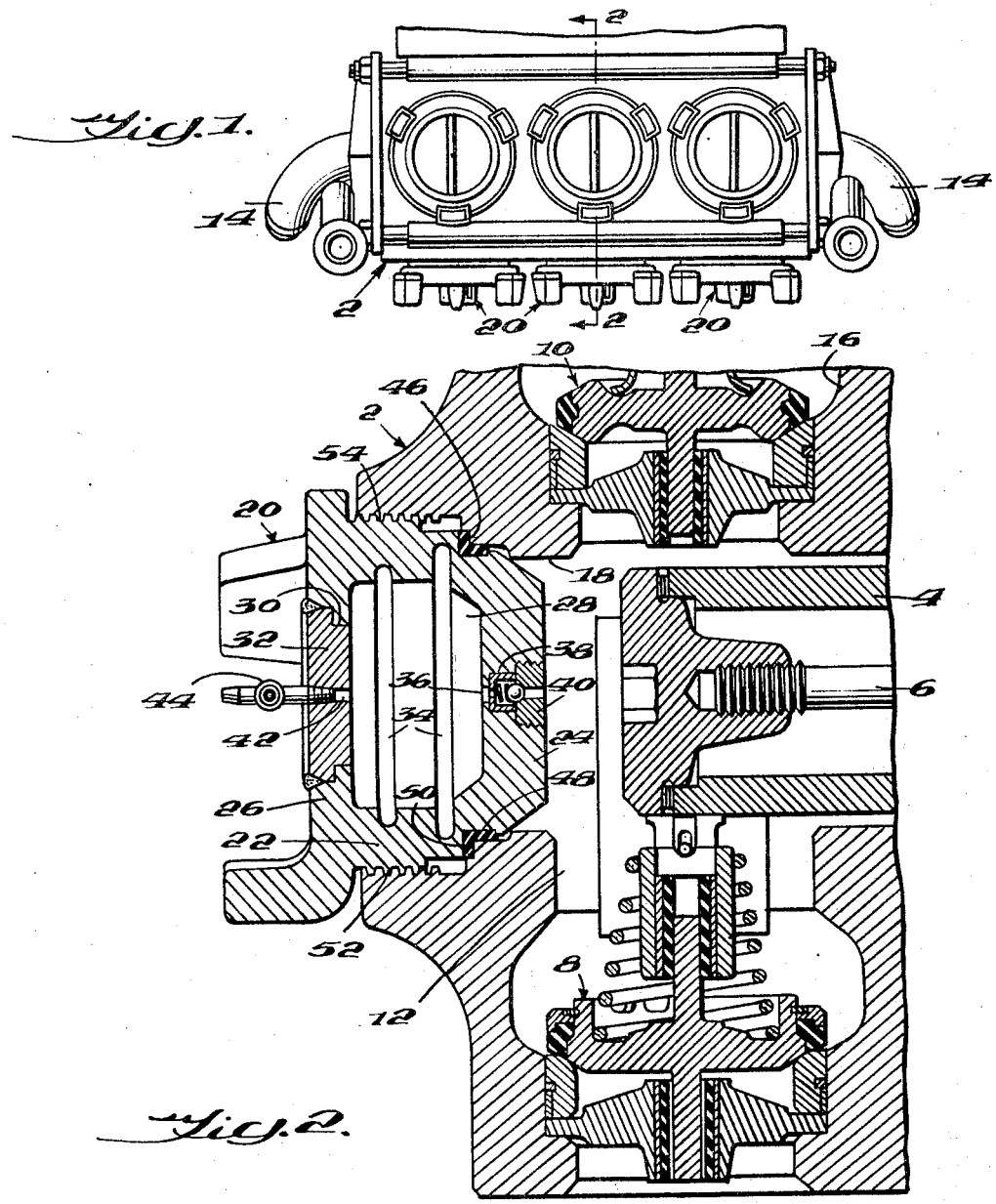
INVENTOR.
MORRIS ROTH,
BY
ATTORNEYS

United States Patent Office 3,430,575
Patented Mar. 4, 1969

3,430,575
CONSTANT THREAD LOAD COVER
Morris Roth, Duncan, Okla., assignor to Halliburton Company, Duncan, Okla., a corporation of Delaware
Filed June 5, 1967, Ser. No. 643,670
U.S. Cl. 103—153            12 Claims
Int. Cl. F04b *19/22*

ABSTRACT OF THE DISCLOSURE

A threaded cover for the valve end of a fluid pump cylinder. The cover is exposed to rapid changes in pressure due to reciprocation of the pump piston or plunger in the cylinder. The effect of these pressure changes on the cover is minimized by providing a hollow unitary cover. The cavity in the cover is substantially coextensive with the screw threads which secure the cover in the housing. A passage conducts fluid through the wall of the cover from the pump cylinder to the cover cavity. A one-way valve in the passage allows fluid flow only into the cover cavity. When the pump is started, fluid is pumped through the passage until the pressure in the cavity is approximately the same as the maximum pressure in the cylinder. The pressure in the cavity causes the cover to expand circumferentially and axially and thereby to resist cyclic loading.

Background of the invention

This invention relates to fluid pumps and more particularly to removable covers for the valve end of a pump cylinder.

In a reciprocating piston type fluid pump one or more cylinders are provided in a pump housing. The valve end of the cylinder is closed by a threaded cover to form a compression chamber between the cover and the piston. Valves control the flow of fluid into and out of the chamber. The fluid pressure in the chamber varies from a low pressure as the piston is drawing low pressure fluid into the pump chamber to a high pressure as the piston is compressing the fluid in the chamber. During each cycle of the piston the pressure in the chamber may vary from a minimum pressure at or below atmospheric pressure to a maximum pressure of several thousand p.s.i. The inner surface of the cylinder cover is exposed to this variation in pressure, and over a long period of time, the stress on the threads which fasten the cover in the housing causes the metal in the cover to weaken or fail. This type of failure due to cyclic loading is known as fatigue failure.

It is also necessary to provide a seal between the cover and the housing to prevent leakage of fluid around the cover. The seal must be mechanically strong to resist the pressure of the fluid in the pump chamber. The conventional type of cover is screwed into the housing and has a shoulder which clamps a seal ring against a corresponding shoulder in the housing. The frictional resistance between the seal and the cover, however, may prevent adequate tightening of the cover threads.

Accordingly, it is an object of this invention to provide an improved cylinder cover for use in reciprocating piston type pumps.

It is a further object of this invention to provide a threaded cylinder cover which resists fatigue failure due to cyclic loading.

It is another object of this invention to provide a threaded cylinder cover which adequately seals against the leakage of fluid between the cover and the pump housing.

Summary of the invention

These objects are accomplished in accordance with a preferred embodiment of the invention by a cylinder cover which has external screw threads and a shoulder adjacent the inner end of the cover that forms a seat for a seal ring. The theads cooperate with threads on the housing to secure the cover in the cylinder opening and the seal ring engages a shoulder in the housing when the cover is screwed tightly into the housing. A chamber is formed in the interior of the cover. A fluid passage communicates through the piston end of the cover to allow fluid of flow from the compression chamber in the housing to the chamber in the cover. A check valve in this passage prevents fluid from flowing out of the cover chamber through the passage. A relief port in the outer wall of the cover permits fluid to flow from the cover chamber into the atmosphere when a manual valve is opened.

During operation of the pump, fluid under high pressure flows from the pump chamber through the passage into the cover chamber until the pressure in the cover chamber is approximately equal to the maximum pressure that occurs in the pump chamber during each pump cycle. The internal pressure in the cover causes the cover to expand circumferentially, thereby imposing a stress on the cover threads which is of such a magnitude that it minimizes the axial loading due to the variations of pressure acting on the piston end of the cover. The internal pressure also causes axial expansion of the cover in the region between the threads and the seal ring. Stressing the cover by constant internal pressure in this manner tends to reduce the effects of variations in axial loading on the threads. This concept is particularly advantageous in large pumps where the cover is necessarily of a large size and in combination with high pump pressures, very high axial loading on the cover results.

Description of the drawings

FIG. 1 is a top plan view of the cylinder portion of a fluid pump according to this invention; and FIG. 2 is an enlarged cross sectional view of the pump along the line 2—2 in FIG. 1.

Description of the preferred embodiment

Referring to FIG. 1, three pump cylinders are arranged in a common housing 2. Generally, the pump has a piston 4 in each cylinder which is reciprocated by a connecting rod 6, as shown in FIG. 2. There is an inlet valve 8 and an outlet valve 10 for each pump chamber 12 in the housing 2. A common exhaust manifold 14 extends through each of the exhaust valve chambers 16 and has common discharge portions at each end of the housing 2.

This invention relates primarily to the cylinder cover arrangement for the pump chamber 12. The housing 2 has a cylindrical opening 18 extending through the housing and communicating with the pump chamber 12. A cylinder cover 20 is secured by screw threads in the opening 18 to confine the fluid within the chamber 12.

The cover 20 includes a generally cylindrical body 22 having an inner wall 24 and an outer wall 26. An internal chamber 28 is formed in the body 22. For convenience of manufacture, a large opening 30 is provided in the wall 26, but the opening is sealed by a plug 32 which is welded or otherwise secured to the body 22. A pair of radial grooves 34 are provided in the peripheral surfaces of the chamber 28 to relieve stresses in the body 22 due to expansion of the plug under pressure of fluid in the chamber 28.

A fluid passage 36 is provided in the inner wall 24. A one-way check valve assembly 38 is mounted in the passage 36 for preventing flow of fluid from the cover chamber 28 to the pump chamber 12, but allowing fluid flow in the opposite direction when the fluid pressure differential is sufficient to displace the ball off of its seat. The valve assembly 38 is retained in the passage 36 by a threaded plug 40. There is also a discharge passage 42 in the outer wall 26 and flow of fluid from the chamber 28 through the passage 42 is controlled by an adjustable bleed valve 44. The valve 44 may be fully closed to prevent leakage of fluid from the cover chamber 28 through the passage 42.

The passage 18 in the pump housing has a shoulder 46 against which a seal ring 48 is seated. Preferably, the ring 48 is formed of an elastomeric material. A corresponding shoulder 50 on the body 22 cooperates with the shoulder 46 for clamping the seal ring 48 between the shoulders 46 and 50. The outer surface of the cylindrical body 22 is provided with conventional screw threads 52 which cooperate with screw threads 54 in the opening 18.

In assembling the cover 20 in the housing 2, the seal ring 48 is applied over the end of the body 22 and is seated against the shoulder 50. The cover 20 is then screwed into the housing 2 by cooperation of the threads 52 and 54. When the seal ring 48 is seated against the shoulder 46, an initial torque may be applied to the cover 20 to compress the ring 48.

The pump is then started. Low pressure fluid is drawn into the chamber 12 through the intake valve 8 during the suction stroke of the piston 4. The piston then commences its compression stroke, at which time the intake valve 8 closes, while the outlet valve 10 remains closed. As pressure in the chamber 12 increases, the pressure differential between the pump chamber 12 and the cover chamber 28 becomes sufficiently great to cause fluid to flow from the pump chamber 12 into the interior of the cover 20, through the passage 36. The bleed valve 44 is closed to prevent leakage of fluid from the chamber 28. Thereafter, the fluid pressure in the chamber 28 increases as additional fluid is pumped into the cover chamber 28 during successive strokes of the piston 4. The outlet valve 10 opens at or near the end of each compression stroke of the piston to allow fluid to escape from the chamber 12 into the manifold 14.

Whenever the pressure in the chamber 28 is equal to or higher than the pressure in the pump chamber 12, the check valve 38 closes to prevent the fluid in the chamber 28 from escaping through the passage 36. During subsequent operation of the pump, the check valve 38 opens only when the pressure in the compression chamber 12 is greater than the pressure in the cover chamber 28, and thus the pressure in the chamber 28 remains substantially constant and approximately equal to the maximum pressure obtained in the chamber 12 during the pumping cycle.

The cylinder head cover of this invention is particularly advantageous when used in pumps having relatively large diameter pistons and operating at high pressures. For example, the piston 4 may have a diameter of the order of three and three-eighths inches and may operate at a maximum pressure during each cycle of about 20,000 p.s.i., or the piston 4 may have a diameter of six inches and during the pumping cycle, the pressure in the chamber 12 may reach a maximum of 6,500 p.s.i. With these high pressures in the cover chamber 28, the cylindrical wall of the body 22 is stressed both circumferentially and axially during the entire pumping cycle. The stresses are sufficiently great to compensate for variations in cyclic loading of the threads 52 and 54 due to variations in pressure in the pump chamber 12.

When the pumping operation is completed and the pump is stopped, the valve 44 may be opened to bleed fluid from the chamber 28. The cover 20 may then be unscrewed from the housing 2, if servicing of the pump becomes necessary.

Since the external screw threads 52 on the plug 20 are substantially coextensive with the chamber 28, substantially uniform circumferential expansion of the cylindrical body 22 causes the threads 52 to be expanded tightly into engagement with the corresponding threads 54 on the housing 2. This engagement produces a fit between the threads that is comparable to an interference fit and the cover 20 is held so rigidly that fatigue stresses are minimized. Furthermore, the fluid in the chamber 28 causes axial expansion of the cylindrical portion of the body 22 between the threads 52 and the shoulder 50. This axial expansion not only loads the threads axially, but also compresses the seal ring 48 to prevent the leakage of fluid between the cover 20 and the opening 18.

While this invention has been illustrated and described in a preferred embodiment, it is recognized that variations and changes may be made therein without departing from the invention as set forth in the claims.

I claim:

1. In a pump of the type having a pump housing with a chamber therein, a reciprocating plunger in said chamber, said housing having inlet and outlet valve means communicating with said chamber and having an opening therein communicating with said chamber, and a cover for sealing said opening comprising:

a rigid integral body having one end exposed to said housing chamber, said body having a cylindrical outer surface, screw thread means for securing said body in said opening, abutment means between said housing opening and said cover for restricting axial movement of said body relative to said housing, said body having a chamber formed therein, said body chamber and said screw threads being arranged substantially coaxially, said body having passage means communicating between said body chamber and the exterior of said body at said one end thereof, and valve means for conducting fluid through said passage means into said body chamber and preventing fluid flow out of said body chamber through said passage means, whereby the body chamber prestresses the cover to resist fatigue loading due to variations in fluid pressure in the pump chamber.

2. The pump apparatus according to claim 1 including seal means on the cylindrical outer surface of said body between said housing opening and said body.

3. The pump apparatus according to claim 1 wherein said body includes an end wall separating said body chamber from the exterior of said one end, said passage means including a passage extending through said end wall.

4. The pump apparatus according to claim 1 wherein said body includes means for selectively bleeding fluid from said body chamber.

5. The pump apparatus according to claim 1 wherein said abutment means includes a radial shoulder in said housing opening and a radial shoulder on said body outer surface in opposed relation to said housing shoulder, said screw thread means being spaced axially from said pump chamber a greater distance than said radial shoulders, and seal means between said body shoulder and said housing shoulder.

6. The pump apparatus according to claim 5 wherein said body chamber is substantially coextensive with said thread means and said radial shoulders.

7. The pump apparatus according to claim 5 wherein said body chamber includes a side wall, said body having a radial groove in said side wall for relieving stresses.

8. The pump apparatus according to claim 5 wherein said body includes an end wall separating said body chamber from the exterior of said one end, said body chamber side wall being substantially cylindrical, said passage means being positioned in said end wall.

9. A pump cylinder cover comprising a generally cylindrical body, said body having an enclosed chamber therein and screw threads on the outer surface of the body, passage means communicating between said body chamber and the exterior of said body adjacent one end, valve means for preventing fluid flow through said passage means out of said chamber and allowing flow into said chamber, said body chamber being substantially coextensive with said screw threads, whereby high pressure fluid trapped in said chamber causes expansion of said body.

10. The pump cylinder cover according to claim 9 wherein said body outer surface includes a radial shoulder adjacent said one end, said body having an end wall at said one end, the interior surface of said end wall defining a portion of said chamber, said end wall surface being spaced a greater distance than said radial shoulder from the opposite end of said body.

11. The pump cylinder cover according to claim 9 including means for selectively bleeding fluid from said chamber.

12. The pump cylinder cover according to claim 10 wherein said body and said end wall are integral.

References Cited

UNITED STATES PATENTS 2,612,116   9/1952   Lowther _____ 103—153

JAMES W. WESTHAVER, *Primary Examiner.*

U.S. Cl. X.R.

138—93; 230—238